UNITED STATES PATENT OFFICE.

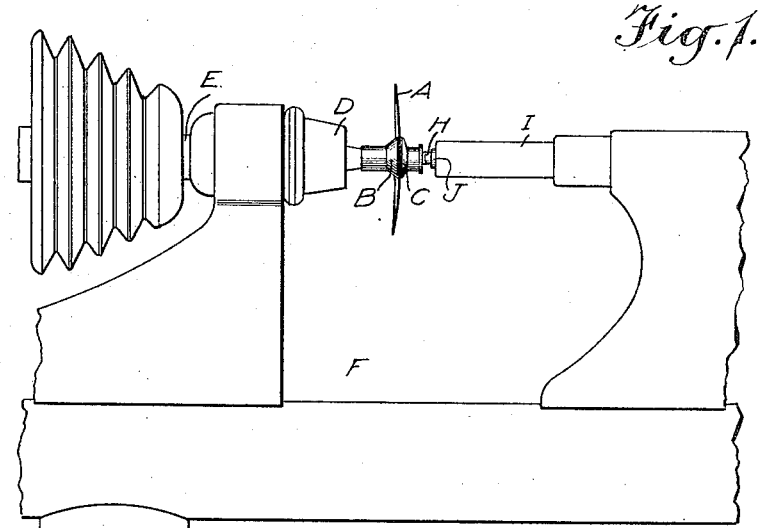
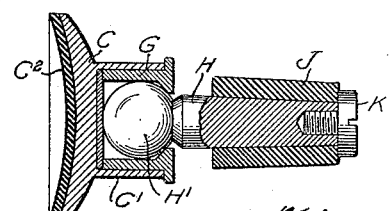
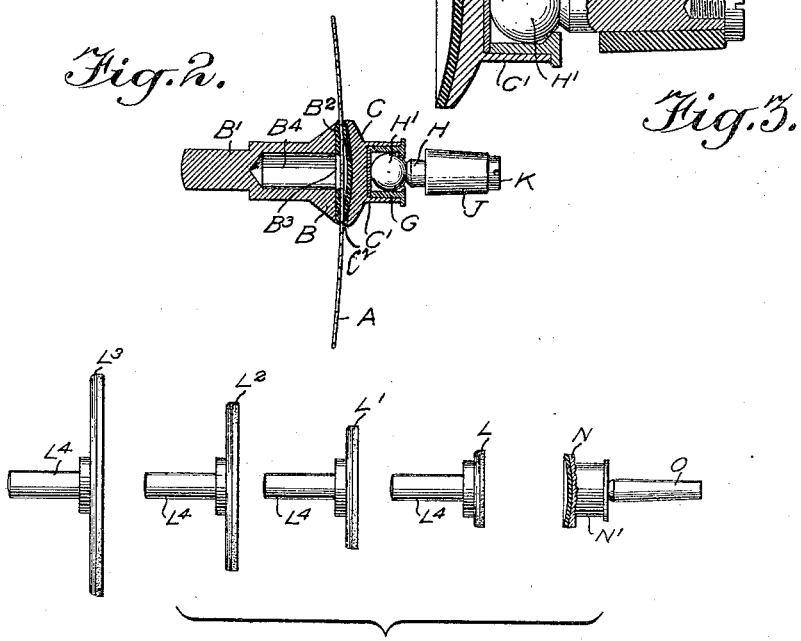

BRUNO BERNDT STENVALL, OF MORRISTOWN, NEW JERSEY.

GRINDING-FIXTURE.

1,184,496.  Specification of Letters Patent.  Patented May 23, 1916.

Application filed June 26, 1915. Serial No. 36,559.

*To all whom it may concern:*

Be it known that I, BRUNO B. STENVALL, a citizen of the United States, and a resident of Morristown, in the county of Morris and State of New Jersey, have invented a new and Improved Grinding-Fixture, of which the following is a full, clear, and exact description.

The object of the invention is to provide a new and improved grinding fixture, more especially designed for use in a watchmaker's or jeweler's lathe, and arranged to permit of conveniently and quickly reducing the diameters of different sized stock watch glasses, to correctly fit the same into the bezels of watches.

In order to accomplish the desired result, use is made of two clamping disks between which a watch glass is clamped, one of the disks being adapted to be attached to a chuck held on the head stock spindle of the lathe, while the other clamping disk is provided with a hub and a support adapted to be carried by the tail stock spindle of the lathe and having a ball and socket joint connection with the said hub.

A practical embodiment of the invention is represented in the accompanying drawings forming a part of this specification, in which similar characters of reference indicate corresponding parts in all the views.

Figure 1 is a side elevation of the grinding fixture as applied to a watchmaker's or jeweler's lathe; Fig. 2 is an enlarged sectional side elevation of the fixture, part being shown in elevation; Fig. 3 is an enlarged sectional side elevation of one of the clamping disks and the support for the same for engagement with the tail stock spindle; and Fig. 4 is a side elevation of a modified form of the grinding fixture with part of one of the disks shown in section.

The watch glass A to be reduced in diameter is clamped between two clamping disks B and C, of which the disk B is provided at its back with an arbor B' adapted to be engaged with a chuck or a similar device D held on the head stock spindle E of a jeweler's or watchmaker's lathe F of the usual construction. By the arrangement described a rotary motion is given to the disk B whenever the lathe is running. The disk C is provided at its back with a hollow recessed hub C' into which fits a socket G engaged by a ball H' held on the forward end of a stud H, preferably made tapering, for engagement with the tail stock spindle I of the lathe. By the arrangement described the disk C has a ball and socket joint connection with the supporting stud H held in the tail stock spindle I so that when the latter is moved forward the disk C is firmly engaged with the right-hand face of the watch glass A to clamp the latter securely in position on the disk B so that when the lathe is running a rotary motion is given to the watch glass A. By the use of a suitable tool, emery or other grinding medium, the edge of the watch disk A can be reduced to correctly fit the watch glass into the bezel of a watch. In practice, coarse emery is usually first applied for reducing the diameter of the watch glass A to be followed by fine emery to polish the edge.

In case the stud H is too small to fit the tail stock spindle I use is made of a conical sleeve J slipped onto the stud H and secured thereon by a screw K, the sleeve J fitting the opening in the tail stock spindle I.

In order to prevent the watch glass A from injury and to insure a firm clamping between the disks B and C, the opposite faces thereof are provided with rubber facings $B^2$ and $C^2$. The face of disk B is preferably flat for accommodating the concave face of the watch glass A while the face of the disk C is preferably concave to readily engage the convex face of the disk A. Thus by the arrangement described, the disks B and C can accommodate watch glasses of different curvature. The rubber facing $B^2$ is preferably provided with a central aperture $B^3$ registering with a central recess $B^4$ formed in the disk B so that the rubber facing expands both at the outer and inner edges on pressing the watch glass A against the said face on advancing the disk C, as previously explained. By the arrangement described a very firm contact is had between the concave face of the watch glass A and the rubber facing $B^2$ to prevent the watch glass A from slipping during the grinding operation.

In using the grinding fixture, the tail stock spindle I is backed up a sufficient distance to allow of conveniently placing the watch glass A in position on the disk B, after which the tail stock spindle I is advanced to engage the disk C with the watch glass A. The operator now rotates the lathe and with his finger engages the edge of the watch glass A to cause the same to center itself between the disks B and C, after which the tail stock spindle I is advanced farther to securely clamp the watch glass A between the disks B and C. The edge of the disk is now ground so as to reduce the diameter of the watch glass to suit the size of the bezel. It is understood that by the use of the grinding fixture shown and described, watch glasses and similar glass disks of various diameters can be readily reduced in diameter. A watchmaker or jeweler has usually a large assortment of watch glasses in stock but it frequently happens that watch glasses do not fit the bezel of a particular watch and consequently such watch glass has to be reduced to fit the bezel. The grinding fixture shown and described can be readily applied to the ordinary watchmaker's or jeweler's lathe to accomplish the desired result.

If desired, a number of different sized disks L, L', $L^2$ and $L^3$ having arbors $L^4$ may be used in the chuck D for accommodating different sized watch glasses clamped in place against the corresponding disk L, L', $L^2$ or $L^3$, by a disk N, similar to the disk C, and having a hub N' mounted on a ball and socket joint, of which the ball is carried by a stud O which corresponds to the stud H previously mentioned. The disks L, L', $L^2$ and $L^3$ as well as the disk N are provided with rubber facings to insure a good grip of the watch glass between the disks.

Having thus described my invention, I claim as new and desire to secure by Letters Patent:

1. A grinding fixture for attachment to a lathe, comprising two disks between which is clamped a watch glass to be ground, one of the disks having a flat surface adapted to be engaged by the concave face of the watch glass and a central recess, this disk having an expansible facing and being provided with an arbor adapted to be engaged with a chuck on the head stock spindle of the lathe to rotate the disk, the other disk having a concave surface provided with an expansible facing adapted to engage the convex face of the watch glass, the said second disk having a hub provided with a ball socket, and a stud provided with a ball engaging with the said ball socket, the stud being adapted to be engaged with the tail stock spindle of the lathe.

2. A grinding fixture for attachment to a lathe, comprising a revoluble disk adapted to be attached to a chuck on the head stock spindle of the lathe, the disk having a central recess and a rubber facing having a central opening in register with the said recess, a clamping disk having a rubber face and provided at its back with a ball socket, and a stud adapted to be attached to the tail stock spindle of the lathe and provided with a ball engaging the said socket.

3. A grinding fixture for attachment to a lathe, comprising a revoluble disk adapted to be attached to a chuck on the head stock spindle of the lathe, the disk having a central recess and a rubber facing having a central opening in register with the said recess, a clamping disk having a rubber face and provided at its back with a ball socket and a stud provided with a ball engaging the said socket, the said stud being tapering, a sleeve having a tapering bore engaged by the said stud and adapted to fit into the tail stock spindle, and a screw screwing into the end of the stud and having a head abutting against the end of the said sleeve.

In testimony whereof I have signed my name to this specification in the presence of two subscribing witnesses.

BRUNO BERNDT STENVALL.

Witnesses:
 DAVID F. BARKMAN,
 ROBERT L. KLINEDINST.

Copies of this patent may be obtained for five cents each, by addressing the "Commissioner of Patents, Washington, D. C."